United States Patent [19]

Lamanna et al.

[11] Patent Number: 5,652,072
[45] Date of Patent: Jul. 29, 1997

[54] BATTERY CONTAINING BIS (PERFLUOROALKYLSULFONYL)IMIDE AND CYCLIC PERFLUOROALKYLENE DISULFONYLIMIDE SALTS

[75] Inventors: William M. Lamanna; Larry J. Krause, both of Stillwater, Minn.

[73] Assignee: Minnesota Mining and Manufacturing Company, St. Paul, Minn.

[21] Appl. No.: 531,598

[22] Filed: Sep. 21, 1995

[51] Int. Cl.$^6$ .................................................. H01M 10/40
[52] U.S. Cl. ........................ 429/198; 429/192; 429/245
[58] Field of Search ............................. 429/192, 198, 429/245

[56] References Cited

U.S. PATENT DOCUMENTS

| | | | |
|---|---|---|---|
| 2,519,983 | 8/1950 | Simons | 204/62 |
| 4,387,222 | 6/1983 | Koshar | 544/4 |
| 4,505,997 | 3/1985 | Armand et al. | 429/192 |
| 4,579,796 | 4/1986 | Muramatsu | 429/198 |
| 4,851,307 | 7/1989 | Armand et al. | 429/192 |
| 5,021,308 | 6/1991 | Armand et al. | 429/194 |
| 5,072,040 | 12/1991 | Armand | 564/82 |
| 5,128,222 | 7/1992 | Yoshizawa et al. | 429/198 X |
| 5,256,821 | 10/1993 | Armand | 564/82 |
| 5,273,840 | 12/1993 | Dominey | 429/192 |
| 5,350,646 | 9/1994 | Armand et al. | 429/198 X |
| 5,437,944 | 8/1995 | Kita et al. | 429/195 |

FOREIGN PATENT DOCUMENTS

| | | |
|---|---|---|
| 2096816 | 11/1993 | Canada . |
| 2239817 | 2/1974 | Germany . |
| 5-326016 | 12/1993 | Japan . |
| 6-231754 | 8/1994 | Japan . |
| WO/93/16988 | 9/1993 | WIPO . |

OTHER PUBLICATIONS

Foropoulos, J., et al., "Synthesis, Properties, and Reactions of Bis((trifluoromethyl) sulfonyl) Imide, (CF$_3$SO$_2$)$_2$NH[1]," *Inorganic Chemistry*, vol. 23, (1984), pp. 3720–3723.

Webber, A., "Conductivity and Viscosity of Solutions of LiCF$_3$SO$_3$,Li(CF$_3$SO$_2$)$_2$N, and Their Mixtures," *Journal of the Electrochemical Society*, vol. 138, No. 9, Sep. 1991.

Kita, F., et al, "On the Characteristics of Electrolytes with New Imide Lithium Salts," *36th Battery Symposium*, Japan, Sep. 12–14, (1995) pp. 13–16 with attachments 9–12.

DesMarteau, D.D., et al., "Superacids of Nitrogen and Carbon," *Journal of Fluorine Chemistry*, vol. 45, (1989), p. 114.

Singh, S., et al., "Chemistry of Perfluoromethylsulfonyl Perfluorobutylsulfonyl Imide," *Inorganic Chemistry*, vol. 29 (1990), pp. 2982–2985.

Fluorad™ Battery Electrolytes literature from Minnesota Mining and Manufacturing Company available in 1992.

Razaq, M. et al., "Perfluorosulfonimide as an Additive in Phosphoric Acid Fuel Cell," *Journal Electrochemicl Society*, vol. 136, No. 1 (1989) pp. 385–390.

"Lithium Batteries" *Industrial Chemistry Library*, vol. 5, pp. 147–152, ed. –Pistoria, G., (1994).

Kita, F. et al., "Conductivities and Oxidation Potentials of Electrolytes with Lithium Salts of Fluoro Organic Imides," *62nd Conference of Electrochemical Society*, Japan, Apr. 3–5, 1995.

Sonoda, T., et al., "Molecular design of New Types of Fluorinated Electrolytes for Lithium Batteries," *36th Battery Symposium*, Japan, Sep. 12–14, (1995).

*Primary Examiner*—Stephen Kalafut
*Attorney, Agent, or Firm*—Gary L. Griswold; Walter N. Kirn; Daniel C. Schulte

[57] ABSTRACT

A high performance battery containing an aluminum current collector is described which includes a noncorrosive salt disposed in a matrix, said salt being a bis (perfluoroalkylsulfonyl)imide having a total of at least 3 carbon atoms or a cyclic(perfluoroalkylenedisulfonyl)-imide.

19 Claims, 2 Drawing Sheets

BATTERY CONTAINING BIS (PERFLUOROALKYLSULFONYL)IMIDE AND CYCLIC PERFLUOROALKYLENE DISULFONYLIMIDE SALTS

TECHNICAL FIELD

This invention relates to fluorinated anions of lithium salts useful in battery electrolyte compositions.

BACKGROUND

Electrolyte salts for use in electrochemical cells, e.g., lithium or lithium ion batteries, must exhibit good ionic conductivity and electrochemical, thermal, and chemical stability. In addition, the components of the electrochemical cell must be stable towards the electrolyte. Stability concerns are particularly acute in the case of electrochemical cells having aluminum cathode current collectors because aluminum is susceptible to corrosion.

Among the known electrolyte salts, lithium bis (trifluoromethanesulfonyl)imide (($CF_3SO_2)_2N^-Li^+$) has good conductivity and stability, but is highly corrosive toward aluminum at potentials above 3 V(vs $Li/Li^+$). $LiPF_6$ has excellent conductivity and is noncorrosive, but is thermally and hydrolytically unstable. $LiO_3SCF_3$ (also called lithium triflate) has good thermal and chemical stability, but has low conductivity and is also highly corrosive toward aluminum at positive electrode potentials above 3V(vs $Li/Li^+$).

Indeed, the corrosion of aluminum at potentials above 3 V in electrolytes containing lithium triflate or lithium bis (trifluoromethanesulfonyl)imide is so severe as to make these salts of little use for applications in the more advanced, high voltage cells, especially rechargeable cells. Thus, the use of presently-available electrolyte salts in high voltage lithium or lithium-ion cells has resulted in batteries having suboptimal performance characteristics such as restricted operating temperature ranges, limited discharge/charge rates and inadequate cycling performance, particularly when aluminum components are used.

DISCLOSURE OF INVENTION

The present invention relates to the discovery of certain salts of fluorochemical anions that are highly conductive in nonaqueous, polar organic media and inhibit corrosion of aluminum at high oxidation potentials. These salts are therefore useful as electrolytes in high voltage electrochemical cells, such as lithium batteries, which contain aluminum components. The fluorochemical salts are comprised of a cationic portion, which is typically a metal cation and an anionic portion. The invention provides electrochemical cells or batteries containing such electrolyte salts and aluminum components.

In one aspect, the invention features a battery that includes at least one positive electrode; at least one negative electrode; at least one aluminum current collector; and an electrolyte comprising a salt disposed in a matrix, said salt having the formula

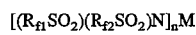

$$[(R_{f1}SO_2)(R_{f2}SO_2)N]_nM \quad (I)$$

or

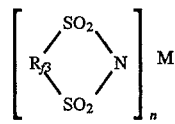

$$\left[ \begin{array}{c} R_{f3} \diagup \begin{array}{c} SO_2 \\ \diagdown \\ \diagup \\ SO_2 \end{array} \diagdown N \end{array} \right]_n M \quad (II)$$

in which $R_{f1}$ and $R_{f2}$ are each independently a straight or branched perfluoroalkyl group of 1 to 12 carbon atoms, a perfluorocycloalkyl group or a perfluorocycloalkyl-perfluoroalkyl group of 4–7 ring carbon atoms and 1–4 carbon atoms on the alkyl chain wherein the ring carbon atoms may be optionally substituted by a straight or branched perfluoroalkyl group of 1 to 12 carbon atoms, with $R_{f1}$ and $R_{f2}$, taken together, having a total of at least 3 carbon atoms, preferably at least 4 carbon atoms; $R_{f3}$ is a perfluoroalkylene moiety of 2 to 6 (preferably 3 to 5) carbon atoms, optionally substituted by a straight or branched perfluoroalkyl group of 1 to 12 carbon atoms or a perfluorocycloalkyl group of 4–7 carbon atoms;

M is a cation with a valence equal to n; and n is an integer of 1 to 4;

wherein the battery has a voltage, in the fully charged state, of greater than 3.0 volts measured at the positive electrode (cathode) vs. $Li/Li^+$.

In a second aspect, the invention features a rechargeable battery that includes at least one positive electrode; at least one negative electrode; at least one aluminum current collector; and an electrolyte comprising a salt disposed in a matrix, said salt having formula I or II as described above, wherein said battery has a voltage in the fully charged state of greater than 3 volts vs. $Li/Li^{3o}$ and a cycle life greater than 50 cycles.

A third aspect of the invention includes a method of inhibiting corrosion of aluminum in the above batteries using an electrolyte containing a bis(perfluoroalkylsulfonyl) imide or cyclic perfluoroalkylenedisulfonylimide salt, as defined above, in a matrix.

The inventive battery exhibits unexpected benefits in electrochemical performance. Specifically, the invention provides the use of electrolyte compositions that exhibit high ionic conductivity and excellent electrochemical, thermal, and hydrolytic stability, yet at the same time inhibit degradation of aluminum battery components (e.g., corrosion of aluminum or aluminum coated components such as current collectors) at voltages typically encountered during battery operation (e.g., positive electrode (cathode) potentials greater than 3 V, preferably greater than 3.5 V and up to but not limited to 4.5 V vs. $Li/Li^+$). High voltage secondary batteries of this invention having aluminum components, such as the current collector, have a cycle life of greater than 50, preferably greater than 100 cycles.

The salts employed in the invention provide all of the desirable features previously associated with $Li^+N(SO_2CF_3)_2$, such as high ionic conductivity and high electrochemical, thermal, and chemical stability. Furthermore, they avoid the use of toxic elements (such as As and Sb) which could be harmful to the environment, and they pose no known explosion hazard (as with perchlorate). Therefore, the salts used in this invention provide much improved properties in nonaqueous electrolytes for high voltage, primary or secondary, lithium or lithium-ion batteries that contain aluminum or aluminum coated components.

DETAILED DESCRIPTION OF THE INVENTION

Figure 1:
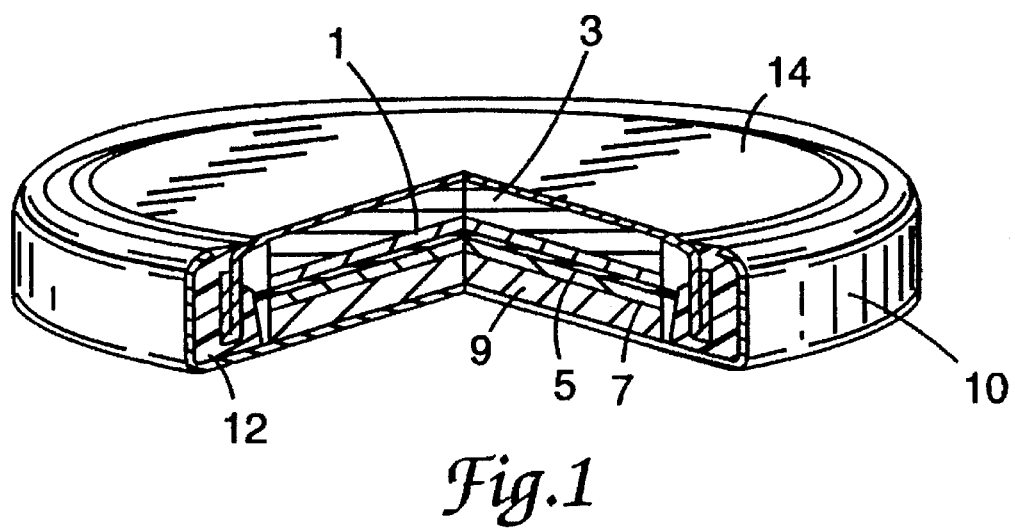
FIG. 1 is a cut-away view of a Li-ion battery of this invention.

Throughout this application the following definitions apply:

"Matrix" refers to a medium (e.g., a solid, liquid, gel or plasticized polymer) in which salts according to formulae (I) and (II) may be dissolved or dispersed to form an ionically conductive electrolyte composition.

"Macromolecular material" refers to a homopolymer, copolymer, or combination thereof, which may or may not be cross-linked and/or plasticized.

"Gel" refers to a physically or chemically cross-linked polymer swollen with solvent.

"Battery" includes all electrical energy storage devices, including capacitors, electrochromic devices, and electrochemical cells.

Voltages specified refer to potentials of a positive electrode measured relative to a Li/Li$^+$ reference electrode, except where otherwise noted.

"Cycle life" refers to the number of charge/discharge cycles measured at a minimum of 80% depth of discharge which the battery provides without losing more than 50% of original capacity (in mAh (milliampere-hour)).

Electrolyte compositions contained in the battery of the invention include a matrix in which is disposed one or more bis-(perfluoroalkylsulfonyl)imide or cyclic perfluoroalkylene disulfonylimide salts having the structure set forth under Disclosure of Invention, above. The electrolyte compositions based upon these salts are particularly useful in primary and secondary (rechargeable) batteries (especially secondary lithium batteries) containing aluminum (positive electrode) cathode current collectors because they do not promote aluminum corrosion at voltages typically encountered during battery operation (e.g., in the range from about 3.0 to 4.5 V measured at the positive electrode vs. Li/Li$^+$).

In secondary batteries of this invention, the electrolyte compositions based upon these salts further provide excellent cycling performance; specifically they provide cycle lives greater than 50 cycles, preferably greater than 100 cycles. Corrosion of aluminum current collectors is known to adversely affect cycle life in rechargeable batteries.

Preferred salts are those of the formula $$[(R_{f1}SO_2)(R_{f2}SO_2)N]_n M \qquad (I)$$

wherein $R_{f1}$ and $R_{f2}$ are each independently a straight or branched perfluoroalkyl group of 1 to 8 carbon atoms, more preferably of 1 to 4 carbon atoms, with $R_{f1}$ and $R_{f2}$, taken together, having a total of at least 3 carbon atoms; M is a cation with a valence equal to n; and n is an integer of 1 to 4. More preferably, $R_{f1}$ and $R_{f2}$ taken together have at least 4 C atoms, and M is an alkali or alkaline earth metal, a transition metal, a rare earth metal, or a Group IIB or IIIB metal.

Also preferred as salts are those of the formula

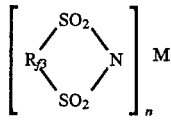
(II)

in which $R_{f3}$ is a perfluoroalkylene group of 2 to 5 carbon atoms optionally substituted by a straight or branched perfluoroalkyl group of 1 to 4 carbon atoms and M and n are as defined above. More preferably, $R_{f3}$ is a perfluoroalkylene group of 3 or 4 carbon atoms. Most preferably, $R_{f3}$ has 3 carbon atoms.

Representative imide anions of Formula I are $^-N(SO_2C_2F_5)_2$, $^-N(SO_2C_2F_5)(SO_2CF_3)$, $^-N(SO_2C_3F_7)_2$, $^-N(SO_2C_3F_7)(SO_2CF_3)$, $^-N(SO_2C_4F_9)_2$, $^-N(SO_2CF_3)(SO_2C_5F_{11})$, $^-N(SO_2C_6F_{13})_2$, $^-N(SO_2C_8F_{17})(SO_2CF_3)$, $^-N(SO_2\text{-}CF_2\text{-}c\text{-}C_6F_{11})(SO_2CF_3)$. Representative imide anions of Formula II are:

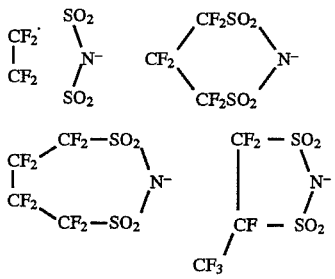

In general, the above described bis(perfluoroalkylsulfonyl)imide and cyclic perfluoroalkylenedisulfonylimide salts can be prepared from the reaction of fluoroalkylsulfonyl fluorides, $R_fSO_2F$, or perfluoroalkylenedisulfonyl fluoride, $FSO_2R_{f3}SO_2F$, with anhydrous ammonia. Symmetrical imides in which $R_{f1}$ and $R_{f2}$ are the same can be prepared in a single step using a weakly basic organic solvent such as triethylamine as shown in Scheme I, whereas unsymmetrical imides in which $R_{f1}$ and $R_{f2}$ are different must be prepared in two steps as shown in Scheme II.

SCHEME I

SCHEME II

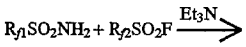

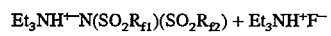

Cyclic perfluoroalkylenedisulfonylimide salts can be prepared as described in U.S. Pat. No. 4,387,222, incorporated herein by reference.

Perfluoroalkylsulfonylfluorides and perfluoroalkylenedisulfonylfluorides used as precursors to the imide salts of this invention can be prepared by a variety of methods known in the art as described, for example, in U.S. Pat. No. 3,542,864; 5,318,674; 3,423,299; 3,951,762; 3,623,963; 2,732,398 and S. Temple, *J. Org. Chem.*, 33(1), 344 (1968), D. D. DesMarteau, *Inorg. Chem.*, 32, 5007 (1993), all of which are incorporated herein by reference.

To form the electrolyte composition, the salt is mixed with the matrix material such that the salt is at least partially dissolved or dispersed in the matrix material. The salt is preferably employed at a concentration such that the conductivity of the electrolyte solution is at or near its maximum value, although a wide range of other concentrations will also serve.

The matrix material may be in the form of a solid, liquid, gel or a liquid impregnated porous membrane. For battery applications, the matrix is chosen to provide the particular conductance, viscosity, mechanical strength, and reactivity properties desired for the electrolyte.

Although lithium (Li$^+$) is a preferred cation M, other useful metal cations are: Na$^+$, K$^+$, Ca$^{2+}$, Mg$^{2+}$, Zn$^{2+}$, and Al$^{3+}$. Preferred metal cations and preferred solvents or matrix materials are dependent on cathode and anode construction in the battery. For lithium or lithium-ion batteries (having a lithium metal or lithium-ion intercalated anode) the preferred cation is Li$^+$, and the preferred solvents are aprotic (e.g., excluding water and alcohols).

Mixtures of matrix materials can be employed and are sometimes preferred in tailoring the matrix material's properties to provide optimum performance. In general, the amount of matrix material is selected such that the salt concentration ranges from about 0.1M to about 2.0M, preferably about 1M.

Suitable matrix materials for preparing electrolyte solutions can be liquid, polymeric or mixtures of polymer and liquid. Examples of suitable solid matrix materials include polymers and copolymers such as polyethers like poly(ethylene oxide), polyesters, polyacrylates, polyphosphazenes, polysiloxanes, poly(propylene oxide), fluoropolymers (e.g., poly(vinylidene fluoride)), and poly(acrylonitrile), as well as the polymers and copolymers described in Armand et al., U.S. Pat. No. 4,505,997, incorporated herein by reference, and mixtures thereof. The polymers may be used in cross-linked or uncross-linked form and or plasticized. Such materials are generally dry, i.e., have a water content less than about 100 ppm, preferably less than about 50 ppm.

In batteries comprising a highly reducing electrode (such as lithium metal) and a liquid matrix material, the liquid is preferably a nonaqueous, polar, aprotic, organic solvent. Such liquids are generally dry, i.e., have a water content less than about 100 ppm, preferably less than about 50 ppm. Examples of suitable aprotic liquids include linear ethers such as diethyl ether, diethylene glycol dimethyl ether, and 1,2-dimethoxyethane; cyclic ethers such as tetrahydrofuran, 2-methyltetrahydrofuran, dioxane, dioxolane, and 4-methyldioxolane; esters such as methyl formate, ethyl formate, methyl acetate, dimethyl carbonate, diethyl carbonate, propylene carbonate, ethylene carbonate, and butyrolactones (e.g. gamma butyrolactone); nitriles such as acetonitrile and benzonitrile; nitro compounds such as nitromethane or nitrobenzene; amides such as N,N-dimethylformamide, N,N-diethylformamide, and N-methylpyrrolidinone; sulfoxides such as dimethyl sulfoxide; sulfones such as dimethylsulfone, tetramethylene sulfone, and other sulfolanes; oxazolidinones such as N-methyl-2-oxazolidinone and mixtures thereof. Maximum conductivities of the electrolyte salts of this invention in typical nonaqueous, polar, aprotic liquid media (e.g., propylene carbonate) are generally in the range of 0.1–20 mS, (milliSiemens) at room temperature, preferably greater than 1 mS.

In some cases, it may be desired to add other salts to the electrolyte composition in order to maximize performance (such as corrosion properties, conductivity of battery components by the electrolyte). Such salts include, but are not limited to, alkali metal, alkaline earth metal, and Group IIIB metal (e.g., aluminum) salts of anions such as BF$_4^-$; PF$_6^-$; AsF$_6^-$; ClO$_4^-$; SbF$_6^-$; R$_f$SO$_3^-$(in which R$_f$ is a perfluoroalkyl group having between 1 (preferably 2) and 12 carbon atoms, inclusive); a bis-(perfluoromethylsulfonyl)imide anion; an anion having a formula selected from the group consisting of R$_{f1}$R$_{f2}$N–(CF$_2$)$_n$–SO$_2$–X$^-$ and

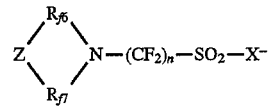

in which X$^-$ is —O$^-$, —N$^-$SO$_2$R$_{f3}$, or

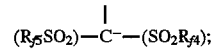

Z is —CF$_2$—, —O—,

or —SF$_4$—; R$_{f1}$ and R$_{f2}$, independently, are —CF$_3$, —C$_m$F$_{2m+1}$, or —(CF$_2$)$_q$—SO$_2$—X$^-$M$^+$;R$_{f3}$ R$_{f4}$, and R$_{f5}$, independently, are —CF$_3$, —C$_m$F$_{2m+1}$, —(CF$_2$)$_q$—SO$_2$—X$^-$M$^+$,

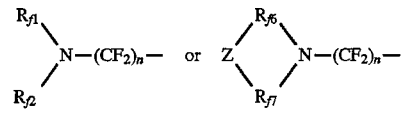

R$_{f8}$ is —CF$_3$, —C$_m$F$_{2m+1}$, or —(CF$_2$)$_q$—SO$_2$—X$^-$M$^+$; R$_{f6}$ and R$_{f7}$, independently, are perfluoroalkylene moieties having the formula —C$_r$F$_{2r}$—; n is 1–4; r is 1–4; m is 1–12 preferably 1–8; and q is 1–4; (such salts are described by Waddell et al. in copending application Ser. No. 08/398,859 of Mar 6, 1995); a bis-perfluoroalkylsulfonyl methide anion R$_f$—SO$_2$—C$^-$(R)—SO$_2$—R$_f$' in which R$_f$and R$_f$', independently, are perfluoroalkyl groups having between 1 and 12 carbon atoms, inclusive, and R is H, Br, Cl, I, an alkyl group having between 1 and 20 carbon atoms, inclusive, aryl, or alkylaryl; and a tris-(perfluoroalkylsulfonyl)methide anion of the formula —C(SO$_2$R$_f$) (SO$_2$R$_f$') (SO$_2$R$_f$'') in which R$_f$, R$_f$', and R$_f$'', independently, are perfluoroalkyl groups having between 1 and 12 carbon atoms, inclusive.

Representative examples of suitable salts include, LiBF$_4$, LiAsF$_6$, LiClO$_4$, LiPF$_6$, CF$_3$SO$_3$Li, C$_2$F$_5$SO$_3$Li, C$_{10}$F$_{21}$SO$_3$Li, (CF$_3$SO$_2$)$_2$NLi, (CF$_3$SO$_2$)$_2$NNa, [(CF$_3$SO$_2$)$_2$N]$_3$Al, (CF$_3$)$_2$ NC$_2$F$_4$SO$_3$Li, (CF$_3$SO$_2$)$_2$C(CH$_3$)Li, cyclo-(CF$_2$SO$_2$)$_2$C(C$_6$H$_5$)Li, (CF$_3$SO$_2$)$_3$CLi, ((CF$_3$)$_2$NC$_2$F$_4$SO$_2$)$_2$NLi and mixtures thereof.

The anodes and cathodes of the inventive electrochemical cell are generally particles of active material blended with a conductive diluent such as carbon black and graphite and bound into a plastic material. Typical binders are polyvinylidene fluoride, ethylene-propylene-diene (EPDM) terpolymer, and emulsified styrenebutadiene rubber (SBR) among others, and the binder may be cross-linked. The binder may be for example a solid carbon matrix formed from the thermal decomposition of an organic compound. The composite electrode material is in turn applied to an expanded metal screen or metal foil (preferably aluminum) current collector using a variety of processes such as coating, casting, pressing, or extrusion. In polymer electrolyte batteries the polymer electrolyte can act as the active material binder.

Some examples of negative electrodes are carbon based materials such as graphite, coke, carbon fiber, and pitch, transition metal oxides such as LiTi$_5$O$_{12}$ and LiWO$_2$, lithium metal and lithium alloys. In the case of lithium-ion batteries, the lithium may be intercalated into a host material such as carbon, (i.e., lithiated carbon) or carbon alloyed with other elements such as Si, B and N, a conductive polymer or an inorganic host material that is intercalatable, such as $Li_xTi_5O_{12}$, $Li_xV_2O_5$, $Li_xV_6O_{13}$, and $Li_xMn_2O_4$ and $Li_xMnO_2$ (the spinel and alpha forms respectively). The material comprising the anode (negative electrode) of an electrochemical cell may be carded on foil (e.g., nickel or copper) backing or pressed into expanded metal screen and alloyed with various other metals.

Active cathode (positive electrode) materials provide cell voltages of at least 3.0 volts at a full state of charge relative to $Li/Li^+$ and include, but are not limited to $Li_xCoO_2$, $Li_xNiO_2$, $Li_xMn_2O_4$ and $Li_xMnO_2$, $V_2O_5$, $V_6O_{13}$, and fluorinated carbon, including the charged and discharged forms of these materials, and conducting polymers such as polypyrrole and polyvinylferrocene.

The invention includes primary and secondary batteries. In primary batteries, the cathode (positive electrode) could be fluorinated carbon $(CF_x)_n$, $SO_2$, $SO_2Cl_2$, or $Ag_2CrO_4$.

The invention is illustrated further by the following examples.

EXAMPLES

The salts $Li^{+31}N(SO_2CF_3)_2$ and $Li^{+-}OSO_2CF_3$ used in the examples are commercially available in high purity from Minnesota Mining and Manufacturing Company as Fluorad™ Lithium Trifluoromethanesulfonimide Battery Electrolyte, HQ- 115 and as Fluorad™ Lithium Trifluoromethanesulfonate, FC-122, respectively. High purity, battery grade $Li^+$ $PF_6^-$ was purchased from Hashimoto Chemical Co., Ltd. through a U.S. distributor (Biesterfeld U.S., Inc.). All salt samples were stored and handled in a nitrogen or argon filled dry box (Vacuum Atmospheres Inc.) to prevent contamination by water.

Example 1

Lithium (trifluoromethanesulfonyl) (perfluorobutanesulfonyl)imide

Under a nitrogen atmosphere, a dry, 500 mL Fisher-Porter pressure bottle equipped with a stainless steel pressure head and magnetic stirrer was charged with 35.00 g $CF_3SO_2NH_2$ (prepared, e.g., as described in Foropoulos and DesMarteau, Inorg. Chem., 23:3720–23 (1984)), 98 mL anhydrous triethylamine and 74.55 g $C_4F_9SO_2F$. The pressure vessel was sealed and the reaction mixture heated to 90° C. with stirring for 17 hours. The volatile components of the reaction mixture were evaporated under reduced pressure at 70° C. then the reaction mixture was treated with a mixture of 700 mL water and 700 mL methylene chloride with stirring to form a two phase mixture. The methylene chloride phase was then separated, washed with two 700 mL portions of water, dried over anhydrous $MgSO_4$, filtered and then evaporated under reduced pressure to yield a dark red liquid. This liquid was combined with 500 g of polyphosphoric acid (Aldrich Chemical Co.) in a short path vacuum distillation apparatus equipped with an ambient air-cooled condenser, and then vacuum distilled at ca. 0.1 Torr. The distillate (96.5 g, corresponding to $HN(SO_2CF_3)(SO_2C_4F_9)$, which solidified in receiver at 0° C., was further purified by sublimation at 70° C., 1.0 Torr. and then added in portions to a slurry of 52 g of $Li_2CO_3$ (99.997% purity, from Aldrich Chemical Co.) in 800 mL of methyl t-butyl ether with stirring at room temperature. After ca. 1 hour $CO_2$ evolution subsided and the reaction mixture was heated to ca. 40° C. for 3.5 hours to complete the neutralization. The mixture was filtered by gravity through filter paper and then filtered again by suction through a 0.22 micron Tefsep™ Teflon membrane (Micron Separations Inc.) to remove particulates. The filtrate was evaporated under reduced pressure at 25°–80° C. to yield a clear, colorless oil. Two 250 mL portions of toluene were combined with the oil and the mixture evaporated at 40°–70° C., 20 Torr after each toluene addition, causing the oil to eventually solidify giving a fine white powder. The solid was transferred to a glass jar and dried in vacuo at 100° C., $10^{-2}$ Torr for 24 hours to yield 77.0 g of the anhydrous title salt. The structure of the product was confirmed by $^1H$ and $^{19}F$ NMR spectroscopy which indicated that the purity of the salt was greater than 99% by weight.

Example 2

Lithium (trifluoromethanesulfonyl) (perfluoroethanesulfonyl)imide

Under a nitrogen atmosphere, a dry 3 L flask equipped with a dry ice condenser, mechanical stirrer, and a sparging tube was charged with 500 mL anhydrous methyl t-butyl ether (MTBE) and cooled below 0° C. in a dry ice bath. To the cold solvent was added 500 g of crude $CF_3CF_2SO_2F$ mixture (containing ca. 23% $CF_3CF_2SO_2F$ by weight in C6–C8 perfluoroalkane solvent). Gaseous anhydrous ammonia (194 g) was gradually introduced through the sparging tube into the resulting mixture at ca. 0° C. with vigorous stirring. Once ammonia addition was complete, the reaction was allowed to proceed for an additional hour after which the dry ice bath was removed and the reaction solution gradually warmed to room temperature with stirring. Excess ammonia was allowed to evaporate while stirring overnight at room temperature. The reaction solution was cooled again to 0° C. and treated with 83.9 g $LiOH.H_2O$ dissolved in 750 mL of water with stirring. The mixture was filtered through filter paper by gravity to remove LiF precipitate. To the filtrate was added concentrated aqueous HCl in portions with stirring at 0° C. until the pH of the mixture was 0.

The resulting two-phase mixture was separated into separate aqueous and ether phases. The aqueous phase was extracted with two additional 400 mL portions of MTBE. The ether fractions were combined, extracted with two 500 mL portions of water, and then dried over anhydrous $MgSO_4$ overnight. The ether solution was filtered by gravity through filter paper and then by suction through a 0.22 micron Tefsep™ membrane (Micron Separations Inc.). The filtrate was concentrated by rotary evaporation, hexane was added, and the solution concentrated again. This was repeated until the product crystallized from solution as a white solid. The product (Crop 1) was isolated by suction filtration through a glass frit giving 33.0 g. A second crop of crystals (20.2 g) was recovered in the same manner from the filtrate by concentrating further followed by filtration. The remaining filtrate was evaporated to dryness at 40° C., 20 mm to yield a third crop of relatively crude product (26.8 g). All product fractions (Crops 1–3) were dried at $10^{-2}$ Torr at room temperature for ca. 15 min to give a combined yield of 80.0 g. Quantitative $^1H$ and $^{13}C$ NMR analysis of the product from Crop 2 indicated that it was the desired product with a purity of 98% by weight.

Under a nitrogen atmosphere, a dry Parr 4560-Series Benchtop Mini Reactor equipped with a 600 mL capacity Monel reactor cylinder, mechanical stirrer, thermocouple and heating mantle was charged with 53 g $CF_3CF_2SO_2NH_2$ (Crops 1 +2) and 152 mL anhydrous triethylamine. While cooling the reactor at −78° C. in dry ice, 55.2 g of gaseous $CF_3SO_2F$ (ca. 94% purity) was condensed into the reactor with stirring. The reactor was sealed and the temperature of the reaction mixture gradually raised to 90° C. with vigorous stirring, then held at 90° C. with stirring for a total of 24 hours. The volatile components of the reaction mixture were evaporated under reduced pressure at 70° C., then the residue was treated with a mixture of 700 mL water and 700 mL methylene chloride with stirring to form a two phase mixture. The methylene chloride phase was then separated, washed with two 700 mL portions of water, dried over anhydrous $MgSO_4$, filtered and then evaporated under reduced pressure to yield a dark red liquid. This liquid was combined with 600 g of polyphosphoric acid (Aldrich Chemical Co.) in a short path vacuum distillation apparatus equipped with an ambient air-cooled condenser, and then vacuum distilled at ca. 15 Torr, 85°–88° C. The distillate (78.1 g, corresponding to $HN(SO_2CF_3)(SO_2C_2F_5)$), which solidified in receiver at 0° C., was converted to the corresponding lithium salt, and further purified, using essentially the procedure described in Example 1 to yield 75.0 g of the anhydrous title salt. The structure of the product was confirmed by $^1H$ and $^{19}F$ NMR spectroscopy which indicated that the purity of the salt was 98% by weight.

Example 3

Lithium Bis(perfluoroethanesulfonyl)imide

As in Example 2, a dry Parr 4560-Series Benchtop Mini Reactor was charged with 155 mL anhydrous triethylamine. While cooling the reactor at −78° C. in dry ice, gaseous $C_2F_5SO_2F$ (100.0 g, <99% purity) followed by anhydrous ammonia (3.51 g) were condensed into the reactor with stirring. The reactor was sealed and the temperature of the reaction mixture gradually raised to 90° C. with vigorous stirring. The reaction mixture was held at 90° C. with stirring for a total of 20.5 hours. The intermediate product, $HN(SO_2C_2F_5)_2$, was isolated as previously described, then added to a slurry of $Li_2CO_3$ (45.7 g, 99.997% purity) in 800 mL of methyl t-butyl ether to produce the lithium salt. This crude lithium salt was further purified using essentially the procedure described in Example 1 to yield 73.34 g (92% yield based upon $NH_3$) of the anhydrous title salt. The structure of the product was confirmed by $^1H$ and $^{19}F$ NMR spectroscopy which indicated that the purity of the salt was 99.9% by weight.

Example 4

Lithium Bis(perfluorobutanesulfonyl)imide

As in Example 1, a dry, 500 mL Fisher-Porter pressure bottle was charged with anhydrous triethylamine (100.5 g) and $C_4F_9SO_2F$ (145.0 g). The pressure vessel was sealed, cooled to −78° C. in dry ice and then charged with of anhydrous ammonia (3.0 g) with stirring. After warming gradually to room temperature, the reaction mixture was heated to 90° C. with stirring for 24 hours. The intermediate product, $HN(SO_2C_4F_9)_2$, was isolated as previously described, then added to a slurry of $Li_2CO_3$ (40.0 g, 99.997% purity) in 800 mL of methyl t-butyl ether to produce the lithium salt. This crude lithium salt was further purified using essentially the procedure described in Example 1 to yield 90.8 g (86% yield based upon $NH_3$) of the anhydrous title salt. The structure of the product was confirmed by $^1H$ and $^{19}F$ NMR spectroscopy which indicated that the purity of the salt was 98% by weight.

Example 5

Lithium Bis(perfluoropropanesulfonyl)imide

As in Example 4, the title compound was prepared using anhydrous triethylamine (100.5 g), $C_3F_7SO_2F$ (1 00.0 g, 68:32 iso:normal isomer ratio), and anhydrous ammonia (3.0 g). A total of 40.8 g of the anhydrous title salt was recovered as a light pink solid. Quantitative analysis by $^1H$ and $^{19}F$ NMR spectroscopy indicated that the product contained the following major components in order of decreasing weight-%: $Li^{+-}N(SO_2C_3F_7)_2$, 85.1%, 39:61 iso:normal $C_3F_7$ ratio; $Li^{+-}N(SO_2i\text{—}C_3F_7)(SO_2F)$, 8.7%; $Li^{+-N(SO}{}_2n\text{-}C_3F_7)(SO_2F)$, 4.2%.

Example 6

Lithium cyclic-1,3-peffluoropropanedisulfonylimide

The acidic form of the title compound, $HN(SO_2C_3F_6SO_2)$, was prepared according to the method described in Koshar, U.S. Pat. No. 4,387,222, Example 1 and converted to the anhydrous lithium salt using the method described in Example 4 of the present description. A total of 26.4 g (56% yield, based upon 1,3-perfluoropropanedisulfonylfluoride) of the anhydrous title salt was isolated with a purity of 98.7% by $^1H$ and $^{19}F$ NMR spectroscopy.

Example 7

Lithium cyclic-1,2-perfluoroethanedisulfonylimide, The acidic form of the title compound, $HN(SO_2C_2F_4SO_2)$, was prepared according to the method described in Koshar, U.S. Pat. No. 4,387,222, Example 3 and converted to the anhydrous lithium salt using the method described in Example 4 of the present description. A total of 16.6 g (61% yield, based upon 1,2-perfluoroethanedisulfonylfluoride) of the anhydrous title salt was isolated with a purity of 99.8% by 1H and 19F NMR spectroscopy.

The inventive electrolyte compositions are particularly useful in that they control or prevent aluminum corrosion in electrochemical cells operating at voltages greater than 3 V and up to but not limited to 4.5 V, referenced to lithium metal.

One way to assess the extent of aluminum corrosion in the presence of a particular electrolyte solution is to measure the anodic current density vs. time response at a fixed d.c. potential of a cell containing an aluminum electrode having a freshly exposed aluminum surface, as described in the Examples section below. The higher the current density, the faster aluminum corrosion is occurring.

Another practical measure of the compatibility of a particular electrolyte solution with aluminum is given by the cycling performance of a high voltage, secondary (or rechargeable) battery containing the electrolyte solution of interest and a cathode comprising an aluminum currect collector.

Test Methods

Corrosion current measurements were made according to the technique generally described in Bard and Faulkner, Electrochemical Methods: Fundamentals and Applications, John Wiley and Sons, New York, 1980, pp. 350–353. An electrochemical cell was constructed having an aluminum working electrode. A lithium wire inserted in a luggin capillary (i.e., a glass capillary into which the electrode was inserted) served as a reference electrode and a 10 $cm^2$ platinum flag was used as an auxiliary electrode. The working electrode was fabricated from a 99.999% aluminum rod inserted into a Teflon sleeve to provide a planar electrode area of 0.07 $cm^2$. The native oxide layer was removed by first polishing the planar working surface with 3 μm aluminum oxide paper using hexane as a lubricant under ambient conditions, followed by a second polishing under an argon atmosphere.

After polishing, the cell was assembled under argon, connecting the three electrodes to a potentiostat. The cell was filled with approximately 10 mL of a 1M solution of the electrolyte salt dissolved in propylene carbonate. The solvent had been previously dried by stirring over $CaH_2$ for 24 hrs., followed by vacuum distillation. The electrolyte salt was dried under vacuum at 120° C. for at least 18 hrs. The final water content of the electrolyte solution was less than 50 ppm, as measured by Karl Fischer titration. The aluminum electrode was polarized at +4.2 V vs. Li/Li$^+$ (iR compensated) while the current was recorded vs. time. Current measurements (in microamps/cm$^2$), taken after one hour, are summarized in Table I, below. Additionally, the area under the current vs. time curve (millicoulombs, mC) is used as a measure of the maximum possible amount of aluminum corrosion occurring. This data is also summarized in Table I. Data for the following salts is included for comparative purpose:

Li$^+$N$^-$(SO$_2$CF$_3$)$_2$, Li$^+$ $^-$O$_3$SCF$_3$ and Li$^+$PF$_6^-$ (designated COMP1, COMP2 and COMP3, respectively in Table I).

Another feature which is important to battery performance is ionic conductivity. Conductivity measurements of various electrolytes at a concentration of 1M in PC/DME, propylene carbonate/dimethoxy ethane (1:1 by volume), are also recorded in Table I.

TABLE I

| Example | Current Density µA/cm$^2$ | Integrated Chronoamperiometric Area (mC) | Conductivity 1M (mS*) |
|---|---|---|---|
| 1 | 5.19 | 2.31 | 9.4 |
| 2 | 2.8 | 2.48 | 10.6 |
| 3 | 2.00 | 0.94 | 9.8 |
| 4 | 2.51 | 0.7 | 7.1 |
| 5 | 1.26 | 0.83 | |
| 6 | 2.31 | 1.37 | 11.1 |
| Comp 1 | 7,570 | 2360 | 9.9 |
| Comp 2 | 17,600 | 5860 | 6.4 |
| Comp 3 | 0.9 | 0.7 | 17 |

*mS = milli-Siemens

The data in Table I shows that while LiN(SO$_2$CF$_3$)$_2$ and LiO$_3$SCF$_3$ are highly corrosive toward aluminum and produce large corrosion currents, the salts of the present invention are at least three orders of magnitude less corrosive and produce corrosion currents comparable to LiPF$_6$, a widely used lithium salt known to be noncorrosive when in contact with aluminum at high potentials. Additionally, the data show that salts used in the present invention provide ionic conductivities useful for high performance battery applications.

High performance can be demonstrated in cells under typical cycling conditions using high voltage, rechargeable lithium ion batteries constructed with aluminum positive current collectors and suitable electrode materials. Electrolyte salts compatible with aluminum will provide long cycle life with minimal loss in capacity; whereas, corrosive salts cause a sharp drop in battery capacity (mAh) after a relatively small number of cycles.

In Examples 8 and 9 and in Comparative Examples 4–6, batteries (as shown in FIG. 1) were prepared and subjected to a minimum of fifty charge-discharge cycles using a commercial battery tester from Maccor Inc., Tulsa Okla. to measure the capacity of the cells. The anode 1 was prepared using a mixture of 85.5 wt % XP grade petroleum coke (Conoco Co), 4.5 wt. % Ensagri Super "S" carbon black and 10 wt. % polytetrafluoroethylene (PTFE) binder, mixed together in a grinding device such as a food processor or coffee grinder and pressed into pellets approximately 12 to 14 mils (0.31 to 0.36 ram) in thickness and 7 mm in diameter. The cathode was formulated using a mixture of 83.7 wt. % LiCoO$_2$, 6.3 wt. % Shawinigan carbon black and 10 wt. % PTFE mixed as described above and pressed into pellets about 0.33 mm thick and 7 mm in diameter. The cell stack assembly comprised a 31 rail (0.80 ram) copper disk 3 as the anode current collector, 14 mil (0.36 mm) thick anode, a 2 mil (0.05 mm) porous polyethylene cell separator 5, 12.5 mil (0.32 mm) thick cathode 7 of LiCoO$_2$ and a 20 mil (0.51 mm) thick aluminum cathode current collector 9. The stack was placed into the chromium steel "1225" coin cell can 10 (12 mm in diameter and 2.5 mm stack depth) and 40 µL of 1.0M electrolyte were added. The can was then compressively sealed with the polypropylene gasket 12 and stainless steel top 14. All cell assembly operations were done in a dry atmosphere. The batteries tested were as follows:

Example 8

1M LiN(SO$_2$C$_2$F$_5$)$_2$, Example 3, in 1:1 (volume) mixture of ethylene carbonate/dimethyl carbonate Example 9

1M LiN(SO$_2$)$_2$(CF$_2$)$_3$, Example 6, in 1:1 (volume) mixture of ethylene carbonate/dimethyl carbonate Comparative Example 4

1M LiN(SO$_2$CF$_3$)$_2$ in 1:1 (volume) propylene carbonate/dimethoxy ethane

Comparative Example 5

1M LiSO$_3$CF$_3$ in 1:1 (volume) propylene carbonate/dimethoxy ethane

Comparative Example 6

1M LiPF$_6$ in 1:1 (volume) propylene carbonate/dimethoxy ethane

Each battery was individually loaded into the battery tester and charged at a constant voltage of 4.2 V, with a maximum current limitation of 5 mA, until the current dropped to 0.1 mA (end of charge). Each cell was then discharged under a constant current of 0.8 mA until the cell voltage reached 2.75 V (end of discharge). After approximately ten charge/discharge cycles each cell was charged under constant voltage of 4.2 V with a maximum current limit of 5 mA until the current reached 0.1 mA. The cells were then discharged under constant current of 0.8 mA until the cell voltage reached 3 V. The current for each cell was then interrupted (0 current) and the voltage recorded for 30 minutes under zero current conditions to provide a measure of internal cell resistance. Each cell was then charged under a constant voltage of 4.2 V with a maximum current limit of 5 mA for a total of 24 hours. The cell was then discharged at a constant current of 0.8 mA to 3.0 V and a 30 minute current interrupt was applied. After the interrupt the cell is discharged to 2.75 V under a constant current of 0.8 mA. The procedure was repeated for a minimum of fifty cycles.

Figure 2:
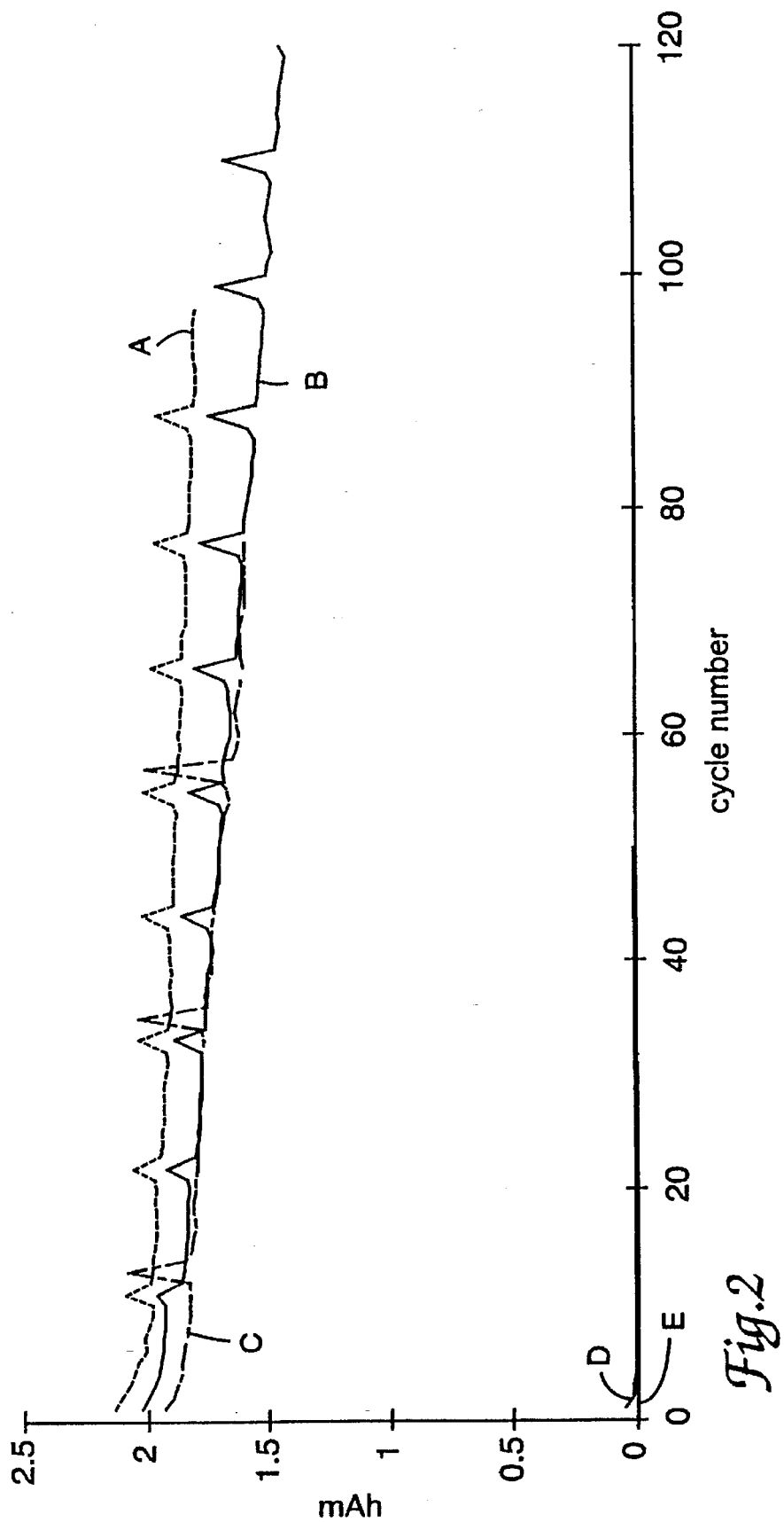
FIG. 2 is a graph illustrating cycling performance of various electrolytes in the Li-ion battery of FIG. 1 by measuring battery capacity vs number of cycles.

The results of these tests are shown in FIG. 2 as a plot of battery capacity (mAh) vs. cycle number for each of the batteries tested.

The lines plotted are:

line A—Example 8 LiN(SO$_2$C$_2$F$_5$)$_2$ line B—Comparative Example 6 LiPF$_6$ line C—Example 9 LiN(SO$_2$)$_2$ (CF$_2$)$_3$ line D—Comparative Example 4 LiN(SO$_2$CF$_3$)$_2$ line E—Comparative Example 5 LiO$_3$SCF$_3$ (lithium triflate)

In FIG. 2, the smooth portion of each line provides a measure of cell capacity as a function of cycle number under conditions of relatively rapid rate of cell discharge. The occasional spikes in FIG. 2 are the result of increased capacity resulting from the application of a current interrupt preceded by a 24 hour charging period. The test procedure demonstrates the effect of a 24 hour charging period (in which corrosion is most likely to occur) on cell capacity before and after the charging period. The cycling data of FIG. 2 shows that LiO$_3$SCF$_3$ and LiN(SO$_2$CF$_3$)$_2$ cause battery capacity to drop precipitously to zero after just one or two cycles. The electrolyte salts of the present invention provide more than fifty cycles with less than a 20% loss in cell capacity. The data further demonstrates that the salts of the present invention provide cycling performance comparable to or exceeding LiPF$_6$, a salt commonly employed in commercial lithium-ion batteries.

The inventive batteries with the specified electrolyte salts are unique in that aluminum corrosion is suppressed at high electrochemical potentials (potentials greater than +3.0 Volts vs. Li/Li$^+$), while at the same time providing very good ionic conductivity and stability (e.g., thermal, electrochemical, and hydrolytic stability). The batteries of Examples 8 and 9 showed no significant increase in internal cell resistance after the 24 hour potential hold.

As shown in Table I and FIG. 2, electrolyte compositions used in the invention are less corrosive than known electrolyte compositions containing other perfluoro-organosulfonyl salts. In some instances, electrolyte compositions used in the invention approach or exceed the performance of inorganic salts such as Li$^+$PF$_6^-$ which are known not to promote corrosion.

What is claimed is:

1. A battery comprising:
   at least one positive electrode;
   at least one negative electrode;
   at least one aluminum current collector in electrical contact with the positive electrode; and
   an electrolyte composition comprising a salt disposed in a matrix, said salt having the formula

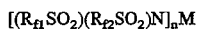
[(R$_{f1}$SO$_2$)(R$_{f2}$SO$_2$)N]$_n$M or

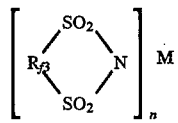

in which R$_{f1}$ and R$_{f2}$ are each independently a straight or branched perfluoroalkyl group of 1 to 12 carbon atoms, a perfluorocycloalkyl group or a perfluorocycloalkyl perfluoroalkyl group of 4–7 ring carbon atoms and 1–4 carbon atoms on the alkyl chain wherein the ring carbon atoms may be optionally substituted by a straight or branched perfluoroalkyl group of 1 to 12 carbon atoms, with R$_{f1}$ and R$_{f2}$ taken together having a total of at least 3 carbon atoms;

R$_{f3}$ is a perfluoroalkylene moiety of 2 to 6 carbon atoms optionally substituted by a straight or branched perfluoroalkyl group of 1 to 12 carbon atoms or a perfluorocycloalkyl group of 4–7 carbon atoms;

M is a cation with a valence equal to n; and n is an integer of 1 to 4, wherein the voltage measured at the positive electrode is greater than 3.0 volts vs. Li/Li$^+$.

2. The battery of claim 1 wherein M is an alkali or alkaline earth metal, a transition metal, a rare earth metal, or a Group IIB or IIIB metal.

3. The battery of claim 1 wherein M is lithium.

4. The battery of claim 1 wherein said salt is of the formula [(R$_{f1}$SO$_2$)(R$_{f2}$SO$_2$)N]$_n$M in which R$_{f1}$ and R$_{f2}$ are each independently a straight or branched perfluoroalkyl group of 1 to 4 carbon atoms, with R$_{f1}$ and R$_{f2}$ taken together having a total of at least 4 carbon atoms.

5. The battery of claim 1 wherein said salt is of the formula

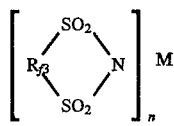

in which R$_{f3}$ is a perfluoroalkylene group of 3–5 carbon atoms optionally substituted by a straight or branched perfluoroalkyl group of 1 to 4 carbon atoms.

6. The battery of claim 5, in which R$_{f3}$ is a perfluoroalkylene group of 3 carbon atoms.

7. The battery of claim 1 wherein said salt is lithium bis(perfluoroethanesulfonyl)imide.

8. The battery of claim 1 further comprising a salt selected from the group consisting of alkali metal, alkaline earth metal, rare earth and group IIB and IIIB metal salts of anions selected from the group consisting of BF$_4^-$; PF$_6^-$; AsF$_6^-$; ClO$_4^-$; SbF$_6^-$; R$_f$SO$_3^-$ in which R$_f$ is a perfluoroalkyl group having between 2 and 12 carbon atoms, inclusive, bis-(perfluoromethylsulfonyl)imide; R$_{f1}$R$_{f2}$N—(CF$_2$)$_{n_f}$—SO$_2$—X$^-$

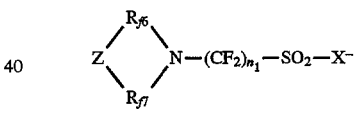

in which X$^-$ is —O$^-$, —N$^-$SO$_2$R$_{f3}$, or

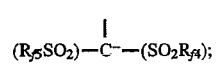
(R$_{f5}$SO$_2$)—C$^-$—(SO$_2$R$_{f4}$);

Z is —CF$_2$—, —O—,

—NR$_{f8}$, or —SF$_4$—; R$_{f1}$ and R$_{f2}$, independently, are —CF$_3$, —C$_m$F$_{2m+1}$, or —(CF$_2$)$_q$—SO$_2$—X$^-$M$^+$; R$_{f3}$, R$_{f4}$, and R$_{f5}$, independently, are —CF$_3$, —C$_m$F$_{2m+1}$, —(CF$_2$)$_q$—SO$_2$—X$^-$M$^+$,

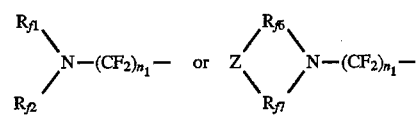

R$_{f8}$ is —CF$_3$, —C$_m$F$_{2m+1}$, or —(CF$_2$)$_q$—SO$_2$—X$^-$M$^+$; R$_{f6}$ and R$_{f7}$, independently, are perfluoroalkylene moieties having the formula —C$_r$F$_{2r}$—; n$_f$ is 1–4; r is 1–4; m is 1–12; and q is 1–4; bis-perfluoroalkylsulfonyl methide anions having the formula $R_f$—$SO_2$—$C^-(R)$—$SO_2$—$R_f'$ in which $R_f$ and $R_f'$, independently, are perfluoroalkyl groups having between 1 and 12 carbon atoms, inclusive, and R is H, Br, Cl, I, an alkyl group having between 1 and 20 carbon atoms, inclusive, aryl, or alkylaryl; and a tris-(perfluoroalkylsulfonyl)methide anion of the formula —$C(SO_2R_f)$ $(SO_2R_f')$ $(SO_2R_f'')$ in which $R_f$, $R_f'$, and $R_f''$, independently, are perfluoroalkyl groups having between 1 and 12 carbon atoms, inclusive.

9. The battery of claim 1 wherein said matrix is selected from the group consisting of polymers, aprotic liquids, and mixtures thereof.

10. The battery of claim 1 wherein said matrix comprises an aprotic liquid medium.

11. A rechargeable battery comprising:
at least one positive electrode;
at least one negative electrode;
at least one aluminum current collector in electrical contact with the positive electrode; and
an electrolyte composition comprising a salt disposed in a matrix, said salt having the formula

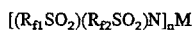
[$(R_{f1}SO_2)(R_{f2}SO_2)N]_nM$ or

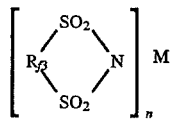

in which $R_{f1}$ and $R_{f2}$ are each independently a straight or branched perfluoroalkyl group of 1 to 12 carbon atoms, a perfluorocycloalkyl group or a perfluorocycloalkyl perfluoroalkyl group of 4–7 ring carbon atoms and 1–4 carbon atoms on the alkyl chain wherein the ring carbon atoms may be optionally substituted by a straight or branched perfluoroalkyl group of 1 to 12 carbon atoms, with $R_{f1}$ and $R_{f2}$ taken together having a total of at least 3 carbon atoms;

$R_{f3}$ is a perfluoroalkylene moiety of 2 to 6 carbon atoms optionally substituted by a straight or branched perfluoroalkyl group of 1 to 12 carbon atoms or a perfluorocycloalkyl group of 4–7 carbon atoms;

M is s cation with a valence equal to n; and n is an integer of 1 to 4, wherein the voltage measured at the positive electrode is greater than 3.0 volts vs. Li/Li$^+$ and the battery has a cycle life greater than 50 cycles.

12. The battery of claim 11 wherein M is an alkali or alkaline earth metal, a transition metal, a rare earth metal, a Group IIB or IIIB metal.

13. The battery of claim 11 wherein M is lithium.

14. The battery of claim 11 wherein said salt is of the formula

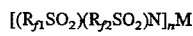
[$(R_{f1}SO_2)(R_{f2}SO_2)N]_nM$ in which $R_{f1}$ and $R_{f2}$ are each independently a straight or branched perfluoroalkyl group of 1 to 4 carbon atoms, with $R_{f1}$ and $R_{f2}$ taken together having a total of at least 4 carbon atoms.

15. The battery of claim 11 wherein said salt is of the formula

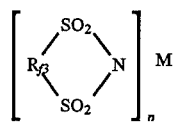

in which $R_{f3}$ is a perfluoroalkylene group of 3–5 carbon atoms optionally substituted by a straight or branched perfluoroalkyl group of 1 to 4 carbon atoms.

16. The battery of claim 11 wherein said salt is lithium bis(perfluoroethanesulfonyl)imide.

17. The battery of claim 12 further comprising a salt selected from the group consisting of alkali metal, alkaline earth metal, rare earth and Group IIB and IIIB metal salts of anions selected from the group consisting of $BF_4^-$; $PF_6^{31}$; $AsF_6^-$; $ClO_4^-$; $SbF_6^-$; $R_fSO_3^-$ in which $R_f$ is a perfluoroalkyl group having between 1 and 12 carbon atoms, inclusive, bis-(perfluoromethylsulfonyl)imide; $R_{f1}R_{f2}N$—$(CF_2)_{n1}$—$SO_2$—$X^-$

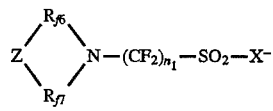

in which $X^-$ is —$O^-$, —$N^-SO_2R_{f3}$, or

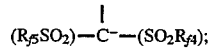

Z is —$CF_2$—, —$O$—,

or —$SF_4$—; $R_{f1}$ and $R_{f2}$, independently, are —$CF_3$, —$C_mF_{2m+1}$, or —$(CF_2)_q$—$SO_2$—$X^-M^+$; $R_{f3}$, $R_{f4}$, and $R_{f5}$, independently, are —$CF_3$, —$C_mF_{2m+1}$, —$(CF_2)_q$—$SO_2$—$X^-M^+$,

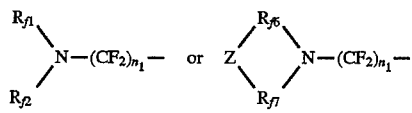

$R_{f5}$ is —$CF_3$, —$C_mF_{2m+1}$, or —$(CF_2)_q$—$SO_2$—$X^{31}$ $M^+$; $R_{f6}$ and $R_{f7}$, independently, are perfluoroalkylene moieties having the formula —$C_rF_{2r}$—; $n_1$ is 1–4; r is 1–4; m is 1–12; and q is 1–4; bis-perfluoroalkylsulfonyl methide anions having the formula $R_f$—$SO_2$—$C^-(R)$—$SO_2$—$R_f'$ in which $R_f$ and $R_f'$, independently, are perfluoroalkyl groups having between 1 and 12 carbon atoms, inclusive, and R is H, Br, Cl, I, an alkyl group having between 1 and 20 carbon atoms, inclusive, aryl, or alkylaryl; and a tris (perfluoroalkylsulfonyl)methide anion of the formula —$C(SO_2R_f)$ $(SO_2R_f')$ $(SO_2R_f'')$ in which $R_f$, $R_f'$, and $R_f''$, independently, are perfluoroalkyl groups having between 1 and 12 carbon atoms, inclusive.

18. The battery of claim 11 wherein said matrix is selected from the group consisting of polymers, aprotic liquids, and mixtures thereof.

19. The battery of claim 11 wherein said matrix comprises an aprotic liquid medium.

* * * * *